United States Patent [19]

Criss

[11] 4,285,719

[45] Aug. 25, 1981

[54] ORGANIC MATERIAL RECYCLING METHOD AND DEVICE

[76] Inventor: Jeremy F. Criss, 5308 Emerald Dr., Sykesville, Md. 21784

[21] Appl. No.: 108,551

[22] Filed: Dec. 31, 1979

Related U.S. Application Data

[63] Continuation-in-part of Ser. No. 878,162, Feb. 15, 1978, abandoned.

[51] Int. Cl.³ ............................ C05F 3/04; C05F 9/04
[52] U.S. Cl. ............................................ 71/13; 4/449; 4/DIG. 12; 71/14; 71/21; 71/64 JC; 210/602
[58] Field of Search ........................ 71/1, 8, 9, 14, 24, 71/23, 13, 64 A, 64 JC, 21, 12; 119/1, 6, 95; 4/449, DIG. 12; 210/602

[56] References Cited

U.S. PATENT DOCUMENTS

| | | | |
|---|---|---|---|
| 2,527,214 | 10/1950 | Graves | 119/1 |
| 3,499,420 | 3/1970 | Atwell | 119/1 |
| 3,916,456 | 11/1975 | Persson | 71/9 |
| 4,108,625 | 8/1978 | Okada | 71/64 A |

*Primary Examiner*—Michael S. Marcus
*Attorney, Agent, or Firm*—Anthony J. DeLaurentis

[57] ABSTRACT

A biological toilet and an organic material recycling method in which human liquid and solid waste (i.e., excrement) and cellulosic material and, optionally, kitchen waste (i.e., food and paper scraps and the like kitchen garbage) are deposited into a receptacle and carried by pressure differential into a recycling or composting container wherein, by the application of environmental factors, including moisture, air, warmth and certain bacteria and worms (such as Eisenia Foetida, the red worm) and other wormlike organisms, the organic material is composted or digested and reacted upon to produce a pleasant smelling, uniform, well granulated substantially neutral, active, compost-like plant nutritional material available for easy distribution.

3 Claims, 3 Drawing Figures

ORGANIC MATERIAL RECYCLING METHOD AND DEVICE

RELATED APPLICATIONS

This application is a continuation-in-part of Ser. No. 878,162, filed Feb. 15, 1978, now abandoned.

BACKGROUND AND PRIOR ART

With the increased populations serviced by waste water treatment plants, the discharges from these plants, i.e, sludge, smelly gases, waste water, etc. have a negative effect on the environment. Also, the prohibitive cost of such central systems are of growing concern, both in rural and urban areas.

Various alternatives are being proposed and made available to the presently generally used water toilet and the central collecting system. Chemical toilets, oil flush toilets, vacuum assisted water toilets, while being water savers, are still extensions of the sewer systems because they eventually have to be emptied into sewers or septic tanks.

Septic tanks aerobic or anaerobic are family sized treatment plants which may or may not clean up the discharge effluent water, and still require pumping to unload periodically with discharge into sewer systems.

The costs of publicly financed treatment facilities sewer and water in the United States can be as much as $5,000 per house served and more, depending on the remoteness of the plant, lot size, and topography.

The advantage of a public system is the absence of individual responsibility for waste disposal. But faced with the taxes and bonded indebtedness required to finance these public sewer and water systems, environmentally concerned citizens are prepared as never before to accept the challenge of controlling his own environment in a zero discharge household by recycling organic waste as plant nutrient, humus and food. Given the proper equipment the homeowner should be able to solve his own waste problems without creating a nuisance and at the same time using the nutritional potential of the processed waste to grow food.

The need for such equipment is obvious. Improper methods like burial of kitchen waste which is dug up by dogs, racoons, etc. are not involved.

Years of addiction to intensive cultivation, growing and harvesting by means of chemical fertilizers have left our rural and urban land in an urgent state of humus and nutrient deficiency.

Composting and biological toilets attempt to provide the proper equipment. The "holding tank" type equipment has a long decomposing cycle not conducive to efficient recycling, but it requires a little looking after. It does not usually require adding of carbonaceous material for composting. This equipment is usually a tank upon which you sit to use, requiring the tank to be located below the floor level. It depends on an up-draft with an insulated vent through the roof to prevent odors in the bathroom. Flies and other bugs can be a problem. If composting is done, the carbonaceous material—leaves, sawdust, to be added must be stored near the equipment, or alternatively stack odors are objectionable when composting is not done.

An alternative to the large volume holding tank type composting toilet is the electric heat coil assisted biological toilet, requiring the decomposing to occur directly beneath the seat in the bathroom. Urine is evaporated up the stack and decomposing is accelerated by the heating process. Composting presents problems in this unit because of its energy use and limited size.

Prior art consists among other things of the art of U.S. Pat. Nos. 3,663,970; 3,808,609; 3,372,018; and 2,750,269, with the various art of reference therein.

Also note as generally related to the subject matter herein are U.S. Pat. Nos. 3,831,340; 3,716,371; 415,246; 3,345,152; 3,837,810; 3,853,480; 2,878,112; 3,248,175; 3,916,456; 3,136,608; 3,175,887; 3,840,907; 2,527,214; 3,499,420; 2,867,055; 4,108,625; 4,040,810; 4,032,318; 2,241,734 and 3,761,237.

Previously in toilets and human waste disposals of this type, the material was either directly supported on heated elements which caused dehydration and/or sterilization, and, therefore, prevented effective fermentation, as shown, for example, in U.S. Pat. No. 3,916,456; or only the liquid portion of the waste material is warmed and this is recirculated with the more solid elements, as shown, for example, in U.S. Pat. No. 3,808,609, thus allowing for liquid phase fermentation. In still other prior art, the method of using ball or semi-ball type valves to allow a vacuum or pressure differential to transport the fecal and liquid matter to a container are disclosed in patents, such as U.S. Pat. No. 3,553,970 and the art of reference therein, and a prior art patent, U.S. Pat No. 3,457,567, by the inventor, who disclosed the invention shown in the numbered application. In all of these patents there is a method shown which in effect transports the organic material from a temporary repository or container to another less temporary container that is a storing and collecting repository or container wherein further operations must be separately performed on the effluent material.

SUMMARY OF THE INVENTION

The organic material recycling method of the present invention comprises initially filling a holding tank or container from about 1/10 to about ½ full with cellulosic material or with a mixture of cellulosic material and top soil, the cellulosic material being any readily available cellulosic material, in varying stages of decay, including deciduous leaves, sawdust, waste paper, cornstalks, hay, rice hulls, palm fronds, tree bark, peat moss or the like. The manner in which the tank is filled with the initial charge and the relative amounts of cellulosic material and top soil are not critical; however, it has been found that the use of a volume ratio of cellulosic material to topsoil ranging from about 6:1 to 1:1 is desirable. In a preferred embodiment, the tank may be filled approximately ⅓ full with a layered mixture comprising a first layer of shredded leave and peat moss (in a 6:1 to 1:1 volume ratio), a second layer of peat moss and topsoil (in a 1:2 to 2:1 volume ratio), and a third layer of shredded leaves. This initial charge of cellulosic material or cellulosic material and topsoil will provide a source of nitrogen consuming bacteria which will break down any urine subsequently deposited into the tank. The nitrogen consuming bacteria which inherently will be present in decomposing cellulosic material and which will multiply rapidly under the conditions existing in the tank, also will aid in the decomposition of the cellulosic material and prevent the formation of ammonia gas.

After the initial charge of cellulosic material or cellulosic material and top soil is deposited in the holding tank, a charge of worms, such as Eisenia Foeteda or the like, is added. Depending upon the size of the holding tank, the number of worms added may vary over wide limits. However, since the worms will grow and multiply in the tank, the number of worms added is not critical. Thus, for a vertically oriented, generally cylindrical holding tank having a diameter of about 3 feet and a height of about 6 feet, the number of worms added to the initial charge may be as low as about 20-30, and as high as about 50,000 or more. Normally, however, a charge of about 2,000 to about 5,000 worms would be added to a tank of this size. Preferably the lower numbers should be added initially because worms must avoid the initial high temperature of composting. When sufficient material has past through this stage the 2,000 to 5,000 worms can be added.

After initially charging the holding tank with cellulosic material and worms, the tank would be sealed and connected to a toilet or hopper such that any material deposited in the hopper could be transferred by suitable pressure differential means onto the top of the material in the holding tank.

The subsequent loading of the holding tank would be due to the transfer of human waste and, optionally, kitchen garbage from the hopper, and to periodic additions of cellulosic material directly into the tank. The periodic addition of cellulosic material into the holding tank is desirable so as to ensure an environment which is favorable for the worms' growth and reproduction cycles, and for the development of the desired soil-like composted product. The amount of cellulosic material which is added for this purpose may vary over relatively wide limits, but generally speaking, the volume of cellulosic material added during each periodic addition should be from about ½ to about 3 times the volume of the solid wastes transferred from the hopper between such periodic additions of cellulosic material, with generally equal volumes being preferred. Visual monitoring may be provided by an observation post in the side of the tank to assure the complete covering of the excrement pile with cellulosic material.

The material in the holding tank is consumed by the worms and bacteria, and is converted, from the bottom of the tank upward, into a non-odiferous soil-like composted mass containing worms, worm castings, and worm capsules. This composted mass is removed periodically from the bottom of the holding tank.

The length of time required for material deposited in the upper portions of the tank to be consumed, composted, and withdrawn from the bottom of the tank may vary over considerable limits depending, in part, on the size of the tank, the ratio and absolute amounts of cellulosic material and human wastes being treated, the number of worms in the tank, etc. However, material deposited near the top of the tank normally is fully composted in a period of from about 6 to about 15 months.

As should be apparent from the foregoing, the present method generally is performed on a continuous or at least semi-continuous basis. Accordingly, a large portion of the castings, worms, capsules, and undigested organic matter is left in the tank after unloading as a "seed" bed and to insure the continued growth of the worms and their cultures, so that they can, along with the nitrogen consuming bacteria, complete the process of digesting newly added organic material and turning it from a smelly mess into a pleasant smelling and pleasant appearing granular compost or soil-like material. Generally speaking, when periodic removals of composted material are made, the "seed" bed left in the tank should occupy no less than about ⅓ of the volume of the tank, with "seed" beds ranging from about ⅓ to 9/10 of the tank volume being preferred.

It is a significant feature of this invention that there is practically no extra liquid needed or used, as is usually used for flushing excrement into any retaining or septic tank. Thus, the organic material being composted is placed in a situation or environment in which it is warm, (50° to 100° F., preferably 75° to 90° F.) and moist (30% to 100% humidity, preferably about 80%), but not too wet. The combination of air, urine, fecal matter, cellulosic material, organic waste (i.e., kitchen garbage) and this warm and moist condition with a high percentage of solids is the ideal situation for the growth and development of the brandling and similar type worms so that they can continually change, by their digestive processes, the smelly coliform, bacteria-laden material deposited into the tank into a non-odiferous, nearly neutral, stable compost matter.

A number of advantages are accomplished in accordance with the present recycling waste disposal method and apparatus, as follows:

1. Composting with cellulosic materials is used to obtain the richest end product, and prevent loss of nitrogen by the formation of ammonia, often associated with the toilets in which composting is not done;
2. Aerobic decay occurs without forced ventilation and without heating or mechanical agitation because the tank is well drained and ventilated;
3. A vacuum delivery system from toilet to the holding tank provides a positive automatic seal between the process tank and the toilet to eliminate bathroom odors. The process tank can be as remote as needed, preferably in an area where carbonaceous material and garbage and table scraps can easily be added and where "compost tea" (i.e. liquid drainage) and humus can easily be withdrawn. It can be located at a shed, workshop or garage nearby;
4. The vacuum delivery provides an initial dispersion and aeration of the excrement unobtainable in other systems. This immediate contact with air is equivalent to over a year's exposure in a holding tank type composter.
5. Worms are used in the tank, to aerate the mass rather than have to depend on mechanical agitation. The worms accelerate the decomposing cycle time to such an extent that the volume of the tank required to handle volume is greatly reduced, approximately three times less than that which would be required of waste matter if the holding tank were used without worms. The worms, when ingesting and excreting their daily volume of material (generally equal to their own weight), increase by many times the surface area of that which they eat. The population of the nitrogen consuming bacteria in the tank is directly proportional to the surface area on which they feed. Thus stabilization is rapidly accelerated as evidenced by the MPN (most probable number) of fecal coli tests of the end product usually ranging from zero to 1 organism program—many times safer than that obtained with other systems. The worms by their digesting of the waste material improve the nutrient properties of the compost remaining in the tank by means of converting it into worm castings. Castings are reported to be two or three times as rich in available nutrients as the material which the worms consume;

6. The vacuum system employed eliminates the expensive through the roof stack;
7. Air circulation is limited in the tank to that which is sufficient to maintain the biological decay without lowering the temperature. The tank is insulated to retain compost action heat in order to maintain a high level of activity in all seasons;
8. The odors associated with using water toilets common to the unvented bathroom are eliminated;
9. The odors and "bugs in the house" problems associated with other compost toilets are completely eliminated by the vacuum and ball valve automatic seal.
10. By utilizing continuous drainage of the process tank, an environment is provided in which the earthworms have sufficient moisture. The small amount of water sprayed into the bowl to clean the bowl of the toilet turns out to be approximately just sufficient for what the worms require and also sufficient to maintain proper aerobic conditions in which to multiply. The end result is the formation of a nutrient-rich humus, which is periodically withdrawn from the bottom of the tank, to use as fertilizer. Worm egg capsules and worms also are in the humus which can assure an increase in worm soil population in the garden area to which it is applied. The nutrient-rich ordorless compost tea (drainage) can be sprinkled on composting cellulosic material in bins to produce heat and humus. The resulting saturated cellulosic material can then be fed to the worm in an outdoor pit to increase the amount of fertilizer obtained. As much as 3 tons of fertilizer can be produced each year in this manner with one toilet and four users.
11. The tank charging means utilizes a central delivery of both human waste, kitchen waste, and cellulosic material in order that a balance activity and layering of said waste can occur. This layering is beneficial to the composting process; and
12. Aside from the above advantages, a benefit which results is that the homeowner can discover that even his residual cellulosic trash now, with the messy organic garbage, is completely recycleable, by the simple expedient of separation of metals, glass, plastics from paper and cellulosic materials. All of this material is recycleable.

DETAILED DESCRIPTION OF PREFERRED EMBODIMENT

Figure 1:
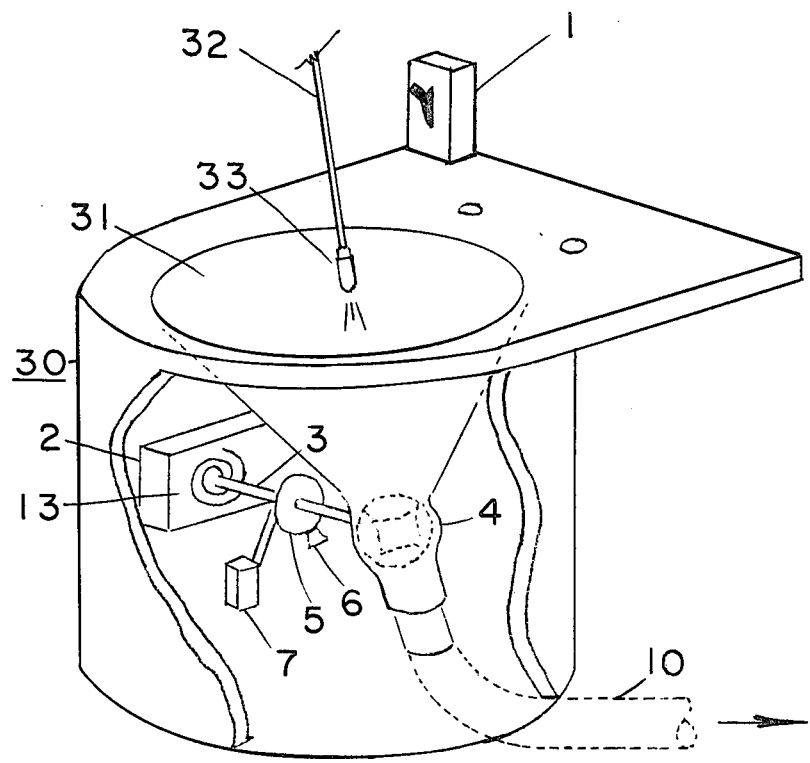
FIG. 1 is an isometric view with a partial cut-away showing toilet of subject invention with the standard personal seat not shown.

To use the toilet 30, a wall or hopper switch 1 is turned on causing shaded pole gear motor 2 to rotate shaft 3 a quarter turn to cause the ball holding valve 4 to be rotated to the full open position. The rotation of shaft 3 is stopped at ¼ turn by shoulder on cam lobe 5 striking stop 6. Motor 2 continues to be energized applying torque to shaft 3 and holding valve 4 in an open position. At approximately ⅜ of a turn cam 5 actuates switch 7 which turns on vacuum motor 8 shown in FIG. 2 and located in holding or composting tank 24. The toilet is now ready to be used 5 seconds after turning on switch.

Figure 2:
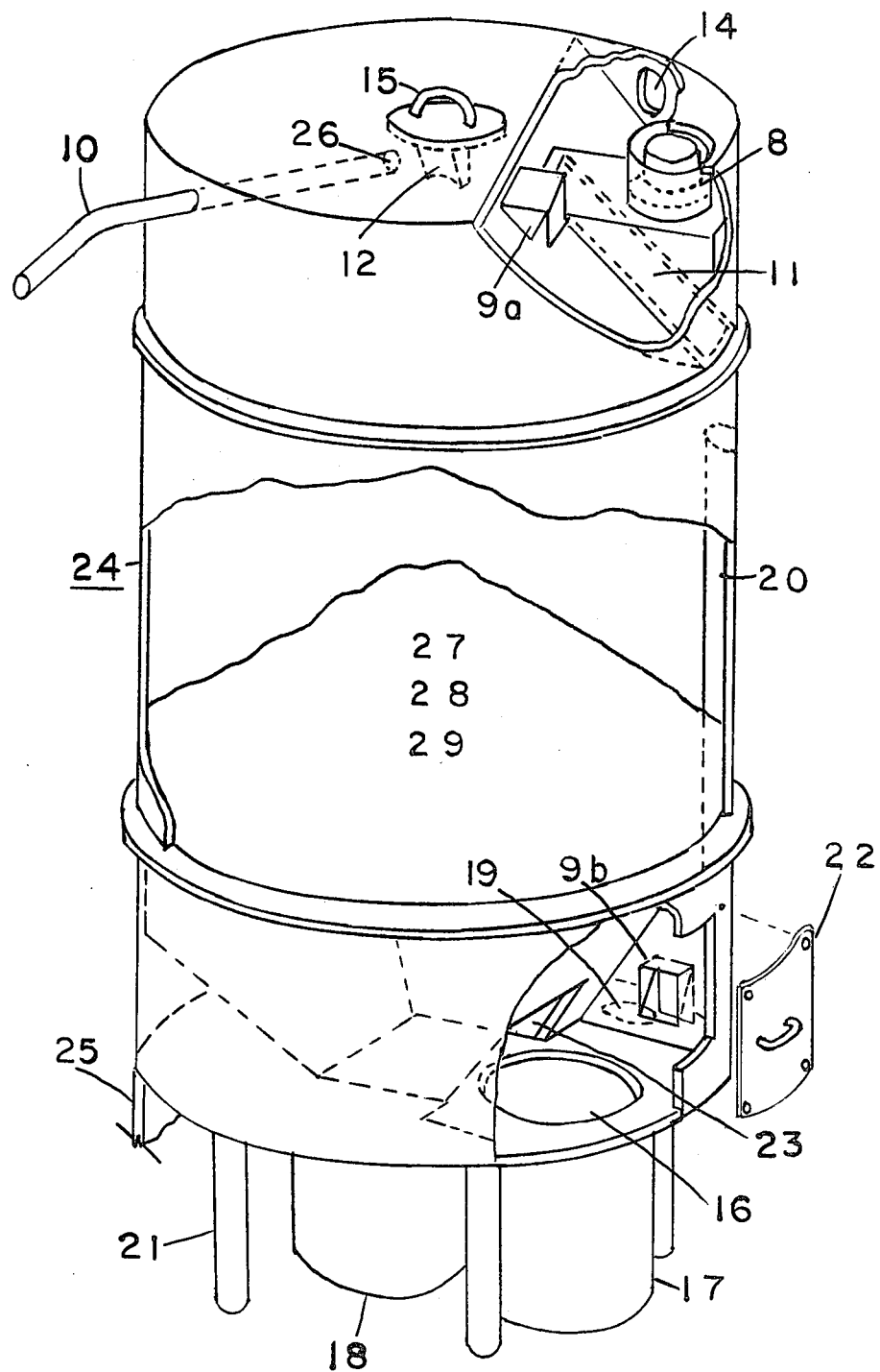
FIG. 2 is a partial isometric view of the composting tank portion of subject invention system located remotely from toilet (i.e., in a garage, shop, etc.).

A vacuum is created in tank 24 shown in FIG. 2. This vacuum "sucks" closed the upper and lower screened flap vent valves 9a and 9b (FIG. 2), causing all of the vacuum "suction" to be applied to the conduit pipe 10 from the toilet. Thus the air flow continues while the user uses the toilet 30. The air is demoisturized by passing through sponge filter 11. All fecal matter, wipe paper, urine, etc. is transported out the end 26 of the conduit pipe 10 directly to the top center of the holding tank where it is deflected against non-stick teflon plate 12 and deposited in the center of the tank by gravity. After use, the hopper 31 of the toilet 30 is sprayed (at 33) with an ordinary garden type sprayer 32 filled with water (not shown) kept handy to the toilet. Normally one or two ounces of water is sufficient to clean the hopper. After spraying the hopper switch 1 is turned off, deenergizing motor 2. Ball valve 4 and motor shaft 3 are returned to the ¼ turn closed position by wind spring 13. At ⅜ turn cam 5 turns off switch 7 shutting off the vacuum motor. The closed ball valve provides a positive air, (bug and odor) seal until the toilet is used again, at which time the vacuum retains odor and flies if any are in the tank.

In the upper right corner of the tank, (FIG. 3, Section A-A), air from either the vacuum motor 8 when the toilet is in use, or from the normal convection when air vent flap valve 9a when the toilet is not in use, is exhausted through outlet 14 to a flexible vent hose (not shown) through the wall to the outside atmosphere.

Removable top 15 with attached deflector 12 can be opened when shredded leaves, etc. or garbage or other cellulosic material is placed in the tank periodically (3 or 4 times per week), according to usage. Consequently a piling and layering of all materials occurs in the tank which aids in composting. In one embodiment, the tank is initially filled to start the operation with approximately ⅓ of a tank full of a mixture comprising shredded leaves and peat moss topped with a mixture of peat moss and topsoil and this is covered with a layer of leaves. Approximately 3,000 worms are added into the topsoil peat moss mixture. Then the tank lid is bolted on and vacuum tubes are connected.

This initial charge of cellulosic material and topsoil inherently provides the nitrogen consuming bacteria necessary to break down the urine to utilize the nitrogen while also decomposing the shredded leaves. This prevents the formation of ammonia gas.

The subsequently loaded layered materials 27, 28 and 29 due to toilet usage and garbage and cellulosic material additions is consumed by the worms and bacteria, which proceed from the bottom, as the pile height increases in the tank.

A porous membrane 16 defining a pressure resistive grille retains all solids and allows liquid drainage by gravity to fill tote buckets 17 and 18 sequentially (filling of bucket 18 not shown), thus preventing any buildup of liquid in the tank which would consequently create an undesirable annaerobic condition. The membrane 16 may comprise a porous rigid foam plastic material, or stainless steel mesh.

Drainage quantity may vary, but for a family of 4 approximately 5 to 8 gallons per week of drainage is removed. This drainage, which is highly nutritious for plants, is an odorless dark colored liquid which can be sprinkled directly between plant rows in the garden, on mulch, over other composting material, or on lawns, if diluted. Up to 4 five gallon tote buckets may be placed beneath the tank 24 and connected with overflow tubes for convenience.

When the toilet 30 is not in use as adequate circulation of air to aid decomposing enters the tank bottom through access opening 19, then through lower screened flap valve 9b and up vertical vent 20 to the top of the tank. The air then circulates through screened upper flap vent 9a and to outlet 14. If the tank is inside a house, a flexible hose can be attached to outlet and can be run through an outside wall in a known manner. In winter, by attaching an insulated skirt 25 under tank 24, the drainage tote buckets may be kept from freezing.

The exterior of both the tank and the lid are insulated, for example, with polyurethane. The inside surface of the tank can be rigid material such as fiberglass or molded plastic or bent sheet metal coated with fiberglass. The tank is supported above the floor on legs 21.

As the tank begins to fill small quantities of the odorless peat moss-like composted material can be withdrawn periodically from the bottom maintaining the tank at least about ⅓ to about ½ full at all times.

To unload the tank, hatch 22 is opened and composted material is shoveled out through opening 23 until porous membrane 16 is exposed. The membrane may be removed and backwashed with a garden hose and returned to service.

A stop place (not shown) is inserted in opening 23 to improve vacuum in the tank.

Figure 3:
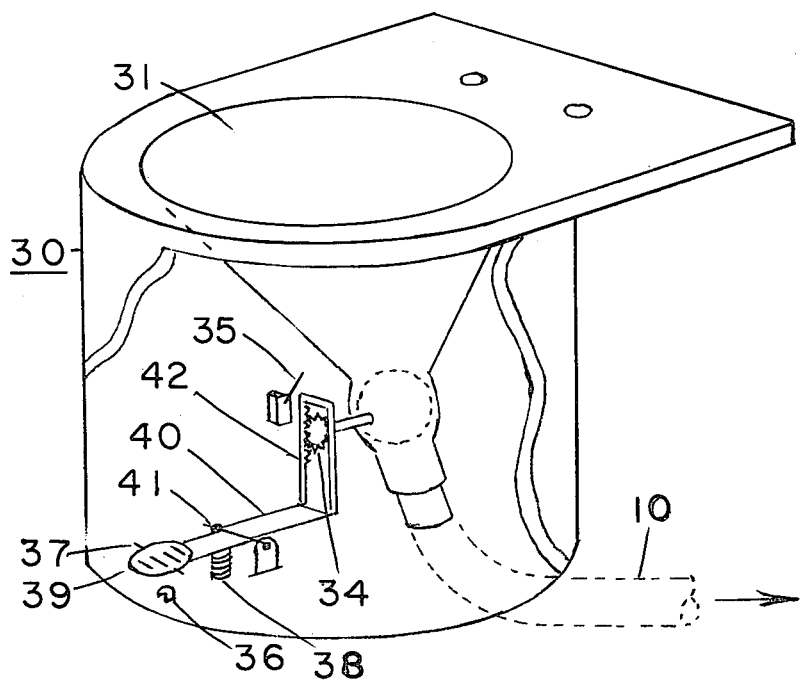
FIG. 3 is an isometric view showing a modification of toilet in FIG. 1, showing a mechanical valve closer.

In FIG. 3 the Bio-Recycler foot operated valve modification operates as follows:

The user depresses foot pedal 39 which pivots arm 40 about shaft 41 and raises toothed rack guide 42 which rotates gear 34, a quarter turn to the full open position of the ball valve 4. Guide 42 also deflects switch arm 35 of switch 7 which turns on vacuum motor 8 (FIG. 2) as described above.

Catch 36 holds the pedal down during use. After use by pressing the front end of pedal 39 with one's toe, the pedal rotates slightly about pedal shaft 37 and catch 36 releases the pedal. Spring 38 then returns pedal 30 to the starting position. Vacuum switch arm 35 of switch 7 turns off vacuum motor 8 and ball valve 4 is closed by means of return spring 13.

It is to be understood that the above described embodiments are merely illustrative of the principles of the present invention and that minor variations may be made therein which will not depart from the spirit and scope of the invention as defined in the appended claims.

What is claimed is

1. A continuous process for converting human wastes and cellulosic material into a non-odiferous soil-like composted material, to provide means for disposing large quantities of these materials without polluting the environment, comprising the steps of:
    (a) depositing human and liquid wastes in a first chamber;
    (b) depositing water into said first chamber to dilute said human wastes and to clean the surfaces of said first chamber;
    (c) providing a second chamber, said second chamber being connected to said first chamber by valved conduit means;
    (d) filling said second chamber from about 1/10 to about ½ full with cellulosic material or with a mixture of cellulosic material and topsoil, the volume ratio of cellulosic material and topsoil being from about 6:1 to about 1:1 when a mixture of cellulosic material and topsoil is used;
    (e) seeding earth worms into said cellulosic material or said mixture of cellulosic material and topsoil in said second chamber;
    (f) transferring said human wastes, diluted in step (b), from said first chamber to said second chamber, said wastes being transferred through said valved conduit means by differential pressure;
    (g) periodically depositing a layer of cellulosic material on top of the diluted human waste transferred to said second chamber, the volume ratio of said layer of cellulosic material ranging from about 1:2 to about 3:1 relative to the volume of said diluted human wastes;
    (h) selectively exposing the contents of said second chamber to warm natural air convection at a temperature from about 50° F. to 100° F. and a humidity of from about 30 to about 100%, except when said transferring step (f) is in progress;
    (i) draining excess liquid, if any, from said second chamber;
    (j) allowing the earth worm hatching cycle and rebirth to proceed in said second chamber; and
    (k) periodically removing from the lower portion of said second chamber a soil-like material comprised of worm-reacted human waste, water, cellulosic material, worm capsules, worms and worm castings.

2. The process of claim 1, wherein, in addition to said human wastes, ordinary household garbage is added randomly with said human wastes.

3. The process of claim 1, wherein said cellulosic material in step (g) is added to said second chamber in approximately equal parts by weight on a solids basis relative to said human excreta, and wherein said earth worms added in step (e) are of a class called Eisenia Foetida.

* * * * *